United States Patent
Teiste et al.

(10) Patent No.: US 10,880,295 B2
(45) Date of Patent: Dec. 29, 2020

(54) ACCESS CONTROL IN A COMPUTER SYSTEM

(71) Applicant: SSH Communications Security OYJ, Helsinki (FI)

(72) Inventors: Marko Teiste, Helsinki (FI); Tero Mononen, Helsinki (FI); Tommi Linnakangas, Helsinki (FI); Jussi Pakkanen, Helsinki (FI); Tatu J. Ylönen, Helsinki (FI); Kalle Jääskeläinen, Helsinki (FI); Markku Rossi, Jarvenpaa (FI)

(73) Assignee: SSH Communications Security OYJ, Helsinki (FI)

( * ) Notice: Subject to any disclaimer, the term of this patent is extended or adjusted under 35 U.S.C. 154(b) by 118 days.

(21) Appl. No.: 15/450,482

(22) Filed: Mar. 6, 2017

(65) Prior Publication Data

US 2018/0255043 A1 Sep. 6, 2018

(51) Int. Cl.
*G06F 21/62* (2013.01)
*H04L 29/06* (2006.01)
(Continued)

(52) U.S. Cl.
CPC ........ H04L 63/083 (2013.01); G06F 21/6218 (2013.01); H04L 41/08 (2013.01);
(Continued)

(58) Field of Classification Search
CPC ... H04L 63/083; H04L 63/108; H04L 63/102; H04L 43/08; H04L 63/0245; H04L 63/06; H04L 41/08; G06F 9/45545

See application file for complete search history.

(56) References Cited

U.S. PATENT DOCUMENTS 6,484,258 B1 * 11/2002 Haverty ................. H04L 12/22
                                                                713/155
7,774,369 B2 * 8/2010 Herzog ................. G06Q 40/12
                                                                707/793

(Continued)

FOREIGN PATENT DOCUMENTS

| EP | 1310856 A2 | 5/2003 | |
|---|---|---|---|
| WO | 0010303 A1 | 2/2000 | |
| WO | WO-0161487 A2 * | 8/2001 | ........... G06F 21/604 |

OTHER PUBLICATIONS

CA Technologies, "Access Governance and RBAC", Aug. 29, 2014, obtained online from <https://docops.ca.com/ca-identity-governance/12-6-02-cr1/EN/getting-started/access-governance-and-rbac>, retrieved on Sep. 28, 2018.*

(Continued)

*Primary Examiner* — Farid Homayounmehr
*Assistant Examiner* — Zhimei Zhu
(74) *Attorney, Agent, or Firm* — Banner & Witcoff, Ltd.

(57) ABSTRACT

The disclosure relates to apparatuses and methods for a computer network comprising hosts accessible by directory users whose user identity information is maintained in a user information directory. The apparatus comprises at least one processor, and at least one memory for storing instructions that, when executed, cause the apparatus to manage information of configurations for attribute based filtering of access requests by the directory users for a plurality of hosts and separately from the user information directory.

20 Claims, 6 Drawing Sheets

(51) Int. Cl.
*H04L 12/26* (2006.01)
*H04L 12/24* (2006.01)
*G06F 9/455* (2018.01)

(52) U.S. Cl.
CPC .......... *H04L 43/08* (2013.01); *H04L 63/0245* (2013.01); *H04L 63/06* (2013.01); *H04L 63/102* (2013.01); *H04L 63/108* (2013.01); *G06F 9/45545* (2013.01)

(56) References Cited

U.S. PATENT DOCUMENTS

| | | | | |
|---|---|---|---|---|
| 8,214,398 B1* | 7/2012 | Cowan | ................ | G06F 21/6218 707/785 |
| 8,224,873 B1* | 7/2012 | Korablev | ............ | G06F 21/6218 707/809 |
| 8,402,514 B1* | 3/2013 | Thompson | .............. | H04L 63/08 726/4 |
| 9,344,427 B1* | 5/2016 | Mehta | ................... | H04L 63/083 |
| 9,774,495 B1* | 9/2017 | Okita | ................ | H04L 41/0803 |
| 9,774,586 B1* | 9/2017 | Roche | ..................... | H04L 63/08 |
| 9,779,566 B2* | 10/2017 | Gammel | ............ | G07C 9/00134 |
| 9,992,186 B1* | 6/2018 | Drozd | ................ | H04L 63/0807 |
| 2002/0013827 A1* | 1/2002 | Edstrom | ........... | H04L 29/12113 709/219 |
| 2002/0147801 A1* | 10/2002 | Gullotta | .............. | G06F 21/6218 709/223 |
| 2002/0156904 A1* | 10/2002 | Gullotta | ................ | G06Q 10/06 709/229 |
| 2003/0105978 A1* | 6/2003 | Byrne | ............... | G06F 17/30067 726/4 |
| 2006/0149848 A1* | 7/2006 | Shay | .................. | H04L 41/0893 709/229 |
| 2007/0044144 A1* | 2/2007 | Knouse | ............... | H04L 63/0815 726/8 |
| 2009/0013049 A1* | 1/2009 | Alexander | ........ | H04L 29/06027 709/206 |
| 2009/0150981 A1* | 6/2009 | Amies | .................. | H04L 63/102 726/5 |
| 2009/0217351 A1* | 8/2009 | Burch | ................ | H04L 63/0281 726/3 |
| 2009/0254392 A1* | 10/2009 | Zander | ................ | G06F 21/6218 705/50 |
| 2010/0024009 A1* | 1/2010 | Comay | ............... | H04L 63/0892 726/4 |
| 2011/0119747 A1* | 5/2011 | Lambiase | ............. | G06F 21/335 726/8 |
| 2011/0289575 A1* | 11/2011 | Shi | .................... | G06F 17/30867 726/8 |
| 2012/0136908 A1* | 5/2012 | Hom | ................... | G06F 21/6218 707/831 |
| 2012/0167158 A1* | 6/2012 | Leach | .................. | G06F 21/604 726/1 |
| 2014/0012964 A1* | 1/2014 | Peterson | ............. | G06F 21/6236 709/220 |
| 2014/0075501 A1* | 3/2014 | Srinivasan | .............. | G06F 21/62 726/1 |
| 2014/0090089 A1* | 3/2014 | D'Souza | .............. | H04L 9/0894 726/29 |
| 2014/0343989 A1* | 11/2014 | Martini | .......... | G06Q 10/063118 705/7.17 |
| 2016/0099924 A1* | 4/2016 | Mehta | ................. | H04L 67/1002 726/7 |
| 2016/0110553 A1* | 4/2016 | Factor | ................... | H04L 63/101 726/30 |
| 2016/0360407 A1* | 12/2016 | Benoit | .................. | H04W 12/06 |
| 2017/0053127 A1* | 2/2017 | Hegfield | ............... | G06F 17/303 |
| 2018/0060226 A1* | 3/2018 | Siggers | ............... | G06F 11/3692 |
| 2018/0255043 A1* | 9/2018 | Teiste | .................... | H04L 63/083 |
| 2018/0278650 A1* | 9/2018 | Ray | .................... | H04L 63/0263 |

OTHER PUBLICATIONS

European Search Report of EP Application No. EP18159685, dated Jul. 26, 2018.
Saurabh Kumar Garg et al, "SMICLOUD: A Framework for Comparing and Ranking Cloud Services", Utility and Cloud Computing, Fourth IEE International Conference ON, IEEE, Dec. 5, 2011, pp. 210-218.
Zhang D. et al: "RoleVAT: Visual Assessment of Practical Need for Role Based Access Control", Computer Security Applications Conference, ACSAC 09, Annual IEEE, Piscataway, NJ, USA, Dec. 7, 2009, pp. 13-22.

* cited by examiner

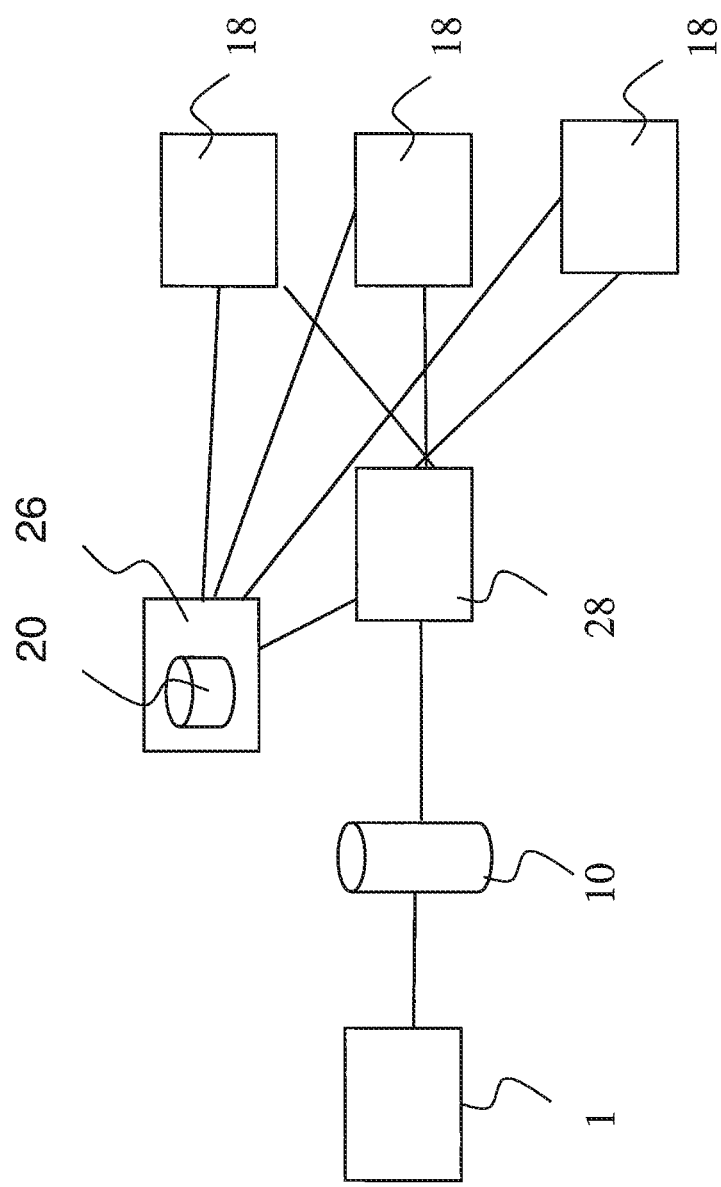

ACCESS CONTROL IN A COMPUTER SYSTEM

FIELD OF THE INVENTION

This disclosure relates to access control in a computer system.

BACKGROUND

Large computing environments can comprise a plurality of entities such as computer devices, user accounts and users. A network host is a computer or other device connected to a computer network. A network host may offer information resources, services, and applications to users or other nodes on the network. A host may be a physical computing device or a virtual computing device (a virtual machine) or a container such as a Linux™ container or equivalent within a physical computing device. Each host may comprise or be associated with one or more user accounts, processes, and/or files. Hosts, user accounts, and other entities in the environment may be associated with groups, e.g., user groups.

Various arrangements for accessing hosts in computing environment by users can be configured. Example of these include web-based access, security protocol (e.g. secure shell protocol; SSH) based access, file transfer access, remote procedure call access, and/or software upgrade access. Such access may be used by, e.g., end users, automation, and/or by system administrators.

Configuring and/or gaining access to a particular entity such as a computing device or a set of computing devices can be provided in different ways. Different ways of configuring access include configuring by using local files on a server (possibly in combination with local clients on the client device), configuration information in directories (e.g., Active Directory, LDAP (Lightweight Directory Access Protocol) directories, NIS (Network Information System) directories), databases and/or local access filters at hosts. Often configuration further relies on configuration data not necessarily perceived as a part of access configuration, such as DNS (Domain Name Service), DHCP (Dynamic Host Configuration Protocol), shared file system configuration, and even configuration of switches and routers in the network. Thus access control can be provided in different locations based on different criteria. The overall awareness of various accesses that are possible or denied, and implications of new, cancelled or otherwise changed access relationships may be difficult to achieve, or lost altogether. This can cause difficulties in managing accesses by users to hosts in a network system. This can be particularly so in large network systems and organizations.

SUMMARY

In accordance with an aspect there is provided an apparatus for a computer network comprising hosts accessible by directory users whose user identity information is maintained in a user information directory, the apparatus comprising at least one processor, and at least one memory for storing instructions that, when executed, cause the apparatus to manage information of configurations for attribute based filtering of access requests by the directory users for a plurality of hosts and separately from the user information directory.

In accordance with another aspect there is provided method for managing access information in a computer network where user information for directory users is stored in a user information directory, the method comprising maintaining, for a plurality of hosts in a storage and separately from the user information directory, information regarding configurations for attribute based filtering of access requests to each of the host by the directory users.

In accordance with a yet further aspect there is provided a data structure stored in a non-transitory computer readable media for use in access control in a computer network, comprising a first data record associating hosts with configuration information records of configurations for attribute based filtering of access requests to the hosts by directory users, and a second data record associating the configuration information records with sets of attributes, related users and directories.

In accordance with a more detailed aspect access request filtering is based on two matrices. A first matrix is configured for mapping hosts to sets of filtering rules. A second matrix is configured for mapping the sets of filtering rules to at least one of directory, attribute and user.

Information of the configurations for filtering access requests by directory users may be collected. The collecting may comprise scanning the hosts and/or monitoring traffic in the computer network. The collected information can be maintained separately from the user information directory.

Access of the directory users to at least one host may be controlled by filtering access requests containing user identity information of the requesting directory user. The filtering can be based on directory user specific filtering information stored in a memory for controlling access of individual directory users to the at least one host. The user identity information can indicate the user as a user defined in a user information directory and/or the user identity information can identify the user information directory where the user is defined.

A key may be required for granting a requested access to the at least one host in addition to user specific filtering information stored in a memory. The key may be an identity key arranged for authorizing a user to access a host having a corresponding authorized key configured as an access granting key. Information about at least one use of the key may also be used. The information of use may comprise information of at least one of the time of use or times of use of the key, identity of at least one host on which the key has been used, identity of at least one host to which the key has been used to authenticate the user, and identity of at least one user for whom the key has been used for authentication.

Information of authentications or logins may also be used as an indication of a directory user. Information about authentications or logins may comprise at least one of an indication of at least one time of authentication or login, an indication of the time of last authentication or login, at least one identification of a SSH key used for at least one authentication or login, and at least one identification of a host from which at least one authentication connection was made.

BRIEF DESCRIPTION OF THE DRAWINGS

FIGS. 5 and 6 show further examples of systems comprising a directory.

DETAILED DESCRIPTION

In the following certain examples relating to aspects of managing access to hosts in a computerized system are described with reference to the appended drawings. A computerized system can be understood as a network comprising data processing entities such as computers and/or virtual machines, containers, user accounts, directories and/or groups of computers, and other associated components, together with associated software.

A physical computer is typically a data processing unit comprising at least one processor, at least one memory and an operating system.

A virtual machine (VM) provides functionality of a physical computer by emulating a computer system. A virtual machine is not necessarily provided by a given physical entity but can be provided in what is known as the "cloud". VM implementations may involve specialized hardware, software, or a combination. Each virtual machine runs a unique operating system. A specific software application runs between the hardware and the operating system for creating and running a VM.

A more recent development is operating system level virtualization. The operating system level virtualization allows resources of a computer to be partitioned via the kernel's support for multiple isolated user space instances. Such virtual instances sharing operating system resources are called containers. A characteristic of containers is that they are fast to start ("open") for the task or application. Containers sit on top of a physical server and its host operating system. Containers can thus be described as simplified virtual machines, a difference being that containers do not have their own operating system. Containers may nevertheless look and feel like real machines to the end users. An advantage of containers is that they are computationally light and quick to start. Pods are groups of containers created or destroyed together, usually belonging to the same logical application.

A user can be a human and/or a machine, or a group of users. Information for a particular user can be stored in a database, for example in a user account. A user account can define an identity and action or actions the defined identity is authorized to perform. For example, a user account can be configured to define that a user can access a host. A user account can typically be accessed by a given entity or entities. The accessing entity can be a human or a machine. Location of the user account can depend on the type thereof.

Information of users, or user accounts, can be stored locally in hosts. Information of users can also be stored in user information directories. A user information directory can be provided by a data structure comprising information of user identities which are members to a directory user entity. The members can be, e.g., employees of a company or the like, members of an organization, participants of an event, or a like defined group of users.

Figure 1:
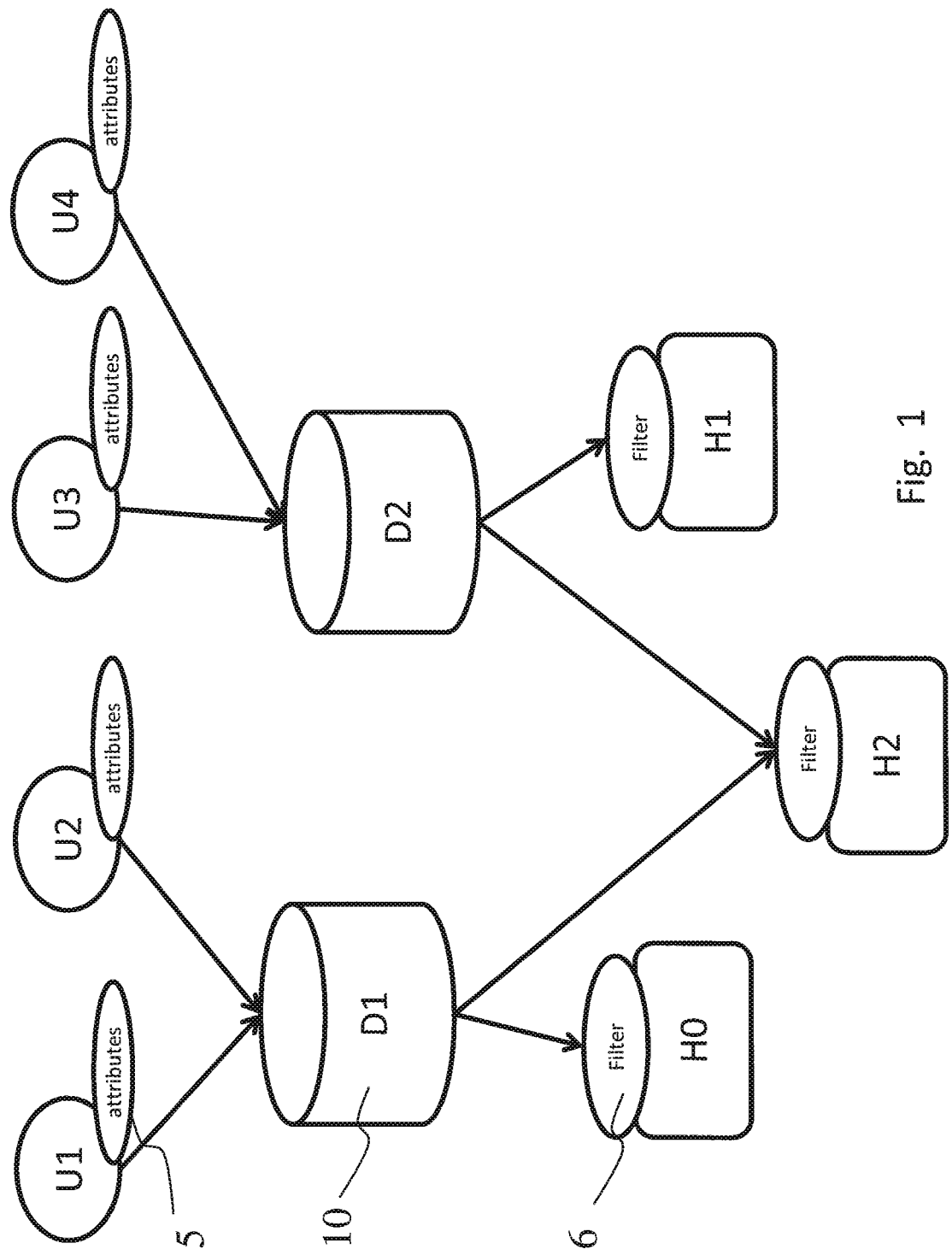
FIGS. 1 and 2 show examples of systems comprising directories.

FIG. 1 shows an example of an access system in a computer network comprising directories. Users U1, U2, U3, U4 for whom an entry has been created in a user information directory D1 and/or D2 can access hosts H0, H1, H2 by means of the directory entry. That is, rather than accessing a host directly the access can be provided via a directory. In the following such a user is called a directory user. A directory user is a user on a host as defined in a user information directory. Directory users can request for access to at least one host. Access typically means operations such as a log in to a host, use of a service provided by a host, access to data on a host and so on.

A directory user can be visible on and/or permitted to access one or more hosts. A host sees a directory user as a particular kind of user defined on the host as a directory user. This is different from local users defined in local password files. That is, a host can be configured to see a directory user as a user which is defined in a user information directory, not a local user. A directory user can be treated differently from local users.

A directory user can use a particular directory on a particular file server or a cluster of file servers as its home directory. The directory user can thus be tied to a particular home directory. If a user has different home directories on different computer devices, each would be handled as a different directory user. For the purposes of this description, such users can be termed e.g. directory user home equivalence group. In general, an equivalence group can represent a cluster of computers. E.g. a host equivalence group is a group of hosts that can either have the same host key or that share a name and/or IP address (in a cluster configuration). Clients can be configured to accept any of their host keys for the shared name and/or IP address. Generally, an authorization to connect to/from one of the hosts in the equivalence group means an authorization to connect to/from any of the hosts in the equivalence group. Members of an equivalence group can also be otherwise associated with each other based on security credentials.

Users U1, U2, U3 and U4 have user identities. Users can also have attributes 5, such as an organization the users belong to. In the example of FIG. 1 Users are mapped to directories D1 and D2 as shown by Table 1 below.

TABLE 1

| Host | Directory | Users | User id |
|------|-----------|-------|---------|
| H0 | D1 | U1; U2 | U1@H0; U2@H0 |
| H1 | D2 | U3; U4 | U3@H1; U4@H1 |
| H2 | D1, D2 | U1, U2; U3 | U1@H2; U2@H2; U3@H2 |

As can be seen from Table 1, users U1 and U2 belong to directory D1 and users U3 and U4 belongs to directory D2.

Host H0 of FIG. 1 has a host or a host group specific filter 6 for filtering attributes of the users. The filter grants or denies access to the host based on the user attributes for users in directory D1. The access filters can have the form of F(host, user attributes), and return the Boolean value (TRUE/FALSE) for the access right. These filter functions can be configured locally to the host, typically by a network administrator.

In the example host H0 can be configured to allow access to users U1 and U2 and host H1 to users U3 and U4. Although user U4 is a member to directory D2, the attributes of user U4 do not pass the access filter for host H2, and consequently host H2 can be accessed only by users U1, U2, and U3 while user U4 is not granted an access.

Table 1 also shows the resulting access relationships for each host of FIG. 1 from the point of view of authenticator and security parameter management. Users at host H0 are defined to have relations U1@H0 and U2@H0, users at host H1 relations U3@H1 and U4@H1, and users at host H2 relations U1@H2, U2@H2, and U3@H2. Managing of this can become demanding as the system requires separate management of all access relationships. A result of this is an N*M matrix where M is the number of users and N is the number of hosts. In an organization with large user and host base the size of the matrix can become unmanageable. Inventors have recognized that this can make control of relations between the different access relationships relating to an individual party and possible access paths difficult. For example, any change in parameters of user U1 will have impact to access relationships U1@H0 and U1@H2, and this impact may be difficult to detect. Further, the filters are configured separately for each hosts, and a management system, for example a key manager or another centralized authenticator management entity, is not conventionally made aware of the configuration. Current centralized key managers do not have access to the filter functions specific to each host, and therefore are not aware of the local filters and their characteristics.

According to the herein disclosed principles information of host configurations, e.g. local filters at hosts is provided at an authenticator management apparatus, e.g. a key manager. In some examples the authenticator management entity can perform management operations on the filters.

In some embodiments at least a part of the local filtering functions is provided in by a filtering entity operative to serve a plurality of hosts. In such embodiments the filtering may be provided by centralized authenticator management entity.

In the following example a functionality providing enhanced visibility to attribute filters is provided. The functionality is called a directory view in this specification. A directory view functionality maintains centrally information on different filter functions for hosts and/or other configurations. Two or more hosts can have a similar filtering configuration. That is, different configurations may not be needed for each host, and two or more hosts can share an attribute based filter. Also, a host can have different configurations. The different configurations can be presented by the directory views. In certain aspects the filtering configurations can be managed centrally.

Configuration information can be split such that instead of the N*M matrix two smaller matrices are provided. A matrix can be created for mapping the hosts to directory views. Another matrix can then represent the different combinations of user attribute filters for users in each directory, and map the users and other information to the directory views. Thus there is created a first data record associating hosts with configuration information records of host specific configurations for attribute based filtering of access requests by directory users and a second data record associating the configuration information records with sets of attributes, related users and directories. The management system has a better visibility on relations between different access relationships of a given user identity, as these are all located in a limited number of directory views. A plurality of hosts, even a substantial number of hosts, can have the same directory view, this improving manageability and visibility in the system.

Figure 2:
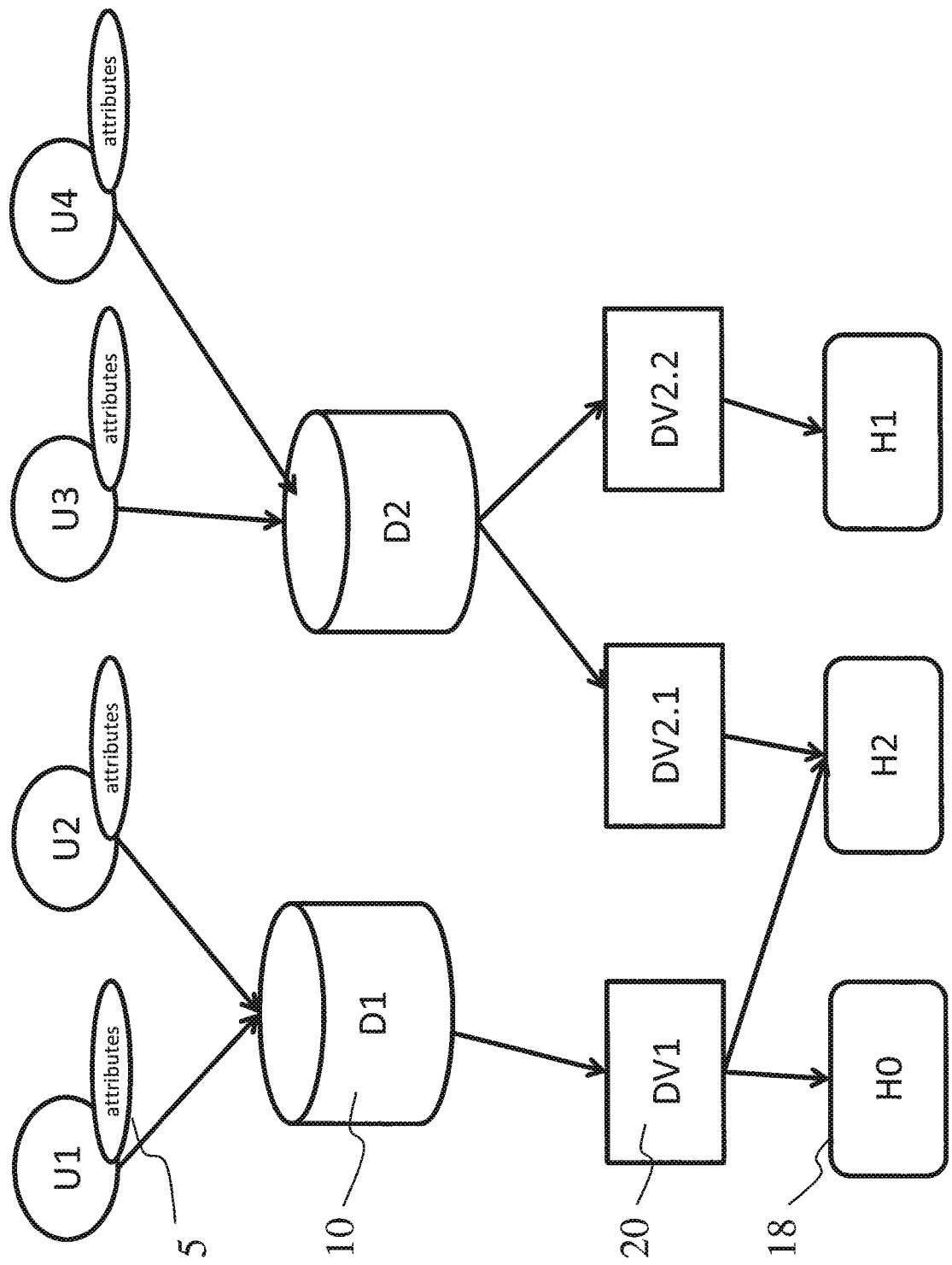
Figure 3:
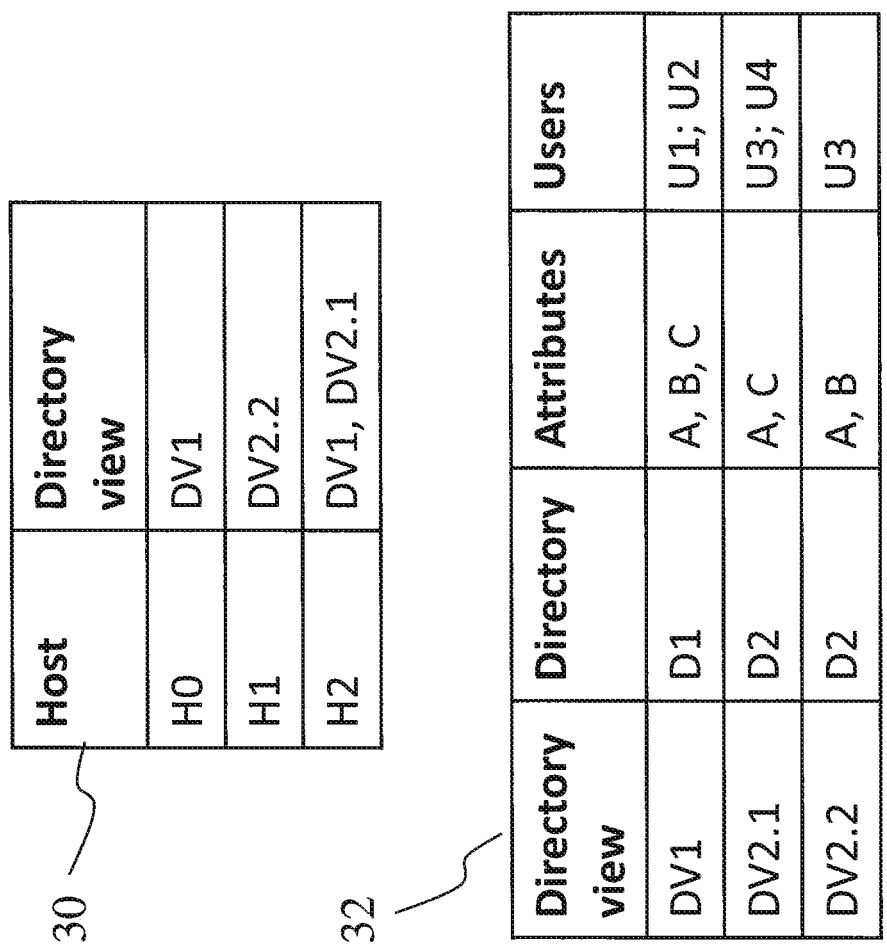
FIG. 3 shows information matrices according to an example.

FIGS. 2 and 3 show a simple example for an architecture where information of users U1, U2, U3, U4 is stored in user information directories D1, D2. A separate filtering function is then provided between the directories and hosts H0, H1 and H2. Two matrices 30 and 32 for separating the information and defining the various relationships of the FIG. 2 entities are shown in FIG. 3. Matrix 30 maps hosts H0, H1 and H2 to directory view. A second matrix 32 maps the directory view to the relevant directory, or directories, attributes and users. It is noted that in an implementation for example in a large organization the number of entries in each matrix will be considerable greater. However, even then the matrices are more manageable than a single matrix such as the one shown in Table 1.

Information on different filter functions for hosts in the form of matrix 32 can be maintained in a central data processing apparatus. According to an example both matrices are maintained in a key manager.

Figure 4:
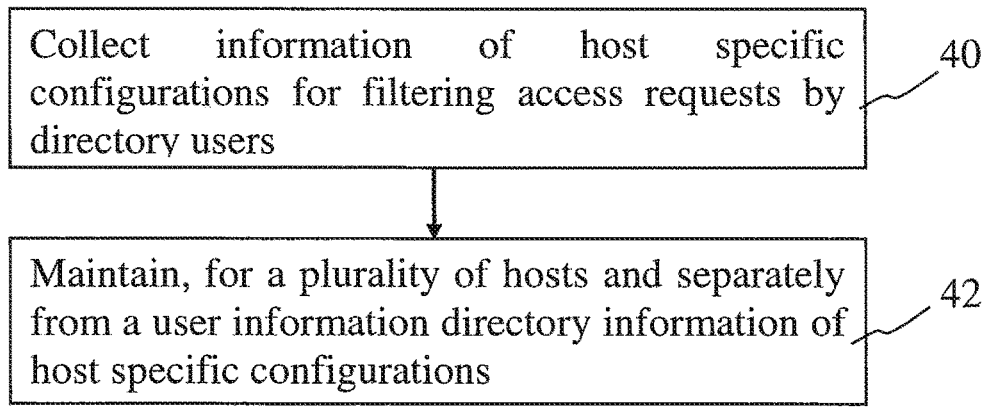
FIG. 4 shows a flowchart according to an example.

FIG. 4 is a flowchart accosting to an embodiment. At 40 information of host configurations for filtering access requests by directory users is collected. The collected information can be used as basis of directory views. A directory view can represent a configuration for attribute based filtering that can be used by a plurality of hosts.

Information for directory views can be collected by means of various manners, for example by scanning hosts and/or monitoring traffic in the network. For example, an apparatus can be configured to detect which hosts serve the same users. At least a part of the information may be provided when a host is attached to the authenticator management apparatus, e.g. a key manager. Such information may be provided during set-up, periodically and/or in response to triggering events such as updates and any changed in configurations at the hosts and/or in the network.

At 42 information of the host configurations is maintained for the plurality of hosts and separately from the user information directory. The filter configuration information can even be maintained and managed in a network node that is separate from directory 10 and filters/hosts 18.

An example of the separate node is shown in FIG. 5 where a record of filter information data 20 is maintained in network node 26. The network node 26 may comprise separate authenticator management entity. In case of the authenticators comprise keys, for example public and private key pairs, the management entity can be provided by a key manager server arranged for centralized management of keys. For example, a Universal Key Manager UKM® server by the assignee may be modified for this purpose. A key manager can be arranged to generate, distribute and manage keys for devices and applications of a data network system. For example, a key manager can create keys and provide each host in the system with necessary key information.

An authenticator management apparatus 26 can be connected to an intermediate data capturing apparatus 28 arranged for intercepting traffic in the network e.g. for security and auditing purposes. Such an arrangement is also shown in FIG. 5. The intermediate apparatus can be arranged to intercept and/or decrypt encrypted communications between users and hosts. More particularly, data between the entities may flow through an intermediate data processing device that hosts a data capturing entity configured to monitor traffic going there through and capture and forward data to another entity.

At least a part of data flowing through the intermediate entity may be encrypted. In such case the intermediate data processing device can be configured to provide a man-in-the-middle (MITM) type operation on encrypted data flowing there through to obtain the plaintext of the data. The MITM operation involves decryption of encrypted data. This would typically be based on knowledge of the private key used in the encryption. This information may be provided by node 26. The data capturing intermediate device can be operated and maintained by a trusted party, typically the owner of the network, and can thus be provided with the necessary keys and/or other security information required for the decryption. It is noted that this is only an example and that the shown architecture and/or MITM type operation is not necessary in all scenarios.

According to a possibility an intermediate device can be configured to provide a security function between hosts and user devices capable of accessing the hosts. In this particular scenario a user accesses a host. The intermediate device can be configured to process requests for access to a host. After receipt of the request, the processor can obtain an authenticator or another security credential from another entity for use in the requested access. This may be provided by sending a request to an external security device and receiving an authenticator therefrom. Alternatively, the intermediate device may be provided with an integrated security device, and an authenticator may be requested therefrom. The intermediate device may further be configured to monitor communications that use the obtained authenticator. The intermediate device may also be configured to control communications that have been established based on authenticators from the security device. The authenticator may comprise a certificate, the control apparatus being configured to request for the certificate from a security device providing a certificate authority (CA). The CA may be an external entity or integrated with the intermediate apparatus. Other types of separate security devices, e.g. an authorization server, are also possible.

The intermediate apparatus can be arranged to use a first type of authenticator for access to the first type of hosts and a second type of authenticators for access to the second type of hosts. The intermediate apparatus may selectively request for an authenticator from a security device depending on the determined type of the host. In this case the determination of the type is performed before requesting for an authenticator. Alternatively, the intermediate apparatus may send the host an authenticator basket comprising different types of authenticators. The host can then select one or more authenticators it is adapted to use.

A possibility is that the intermediate has obtained authenticators for the different types of hosts, and determines whether to use an authenticator it has already received from a security device depending on the determined type of the host. The first type of hosts may comprise legacy hosts and the second type of hosts may comprise cloud hosts. The apparatus may be configured to determine whether the target host is a legacy host or a cloud host. The legacy target hosts do not necessarily support certificate based authentication, or the legacy hosts are not configured to use certificates. Instead, the legacy hosts may operate based on e.g. principal key pairs. For example, "authorized_keys" files of target accounts can have been populated with the public keys of the corresponding "Principal Keypairs". The population can be done e.g. in the host provisioning phase. A possibility is to perform the population dynamically using a key management system. The intermediate apparatus can be configured to determine whether the certificate or principal keys based access shall be used. According to an aspect the apparatus is configured to, in response to a request for access to a host, determine the type of the host, and request for a certificate in response to determining that the host is a cloud host, and to use the principal keypairs in response to determining that the host is a legacy host.

It is noted that that credentials, e.g. keys (authorized keys, SSH keys etc.) can be stored in home directories or in any other type of directory. E.g., SSH keys may be defined in a user information directory, without having to be in the user's home directory. Distinct directory user data structures can also exist for each storage location used as the home directory of the user on different hosts.

A user information directory data structure can comprise at least two user data structures, where each user data structure comprises a user identification. The user information data structure can be accessible by more than one host using a communications protocol (e.g., LDAP).

Figure 6:
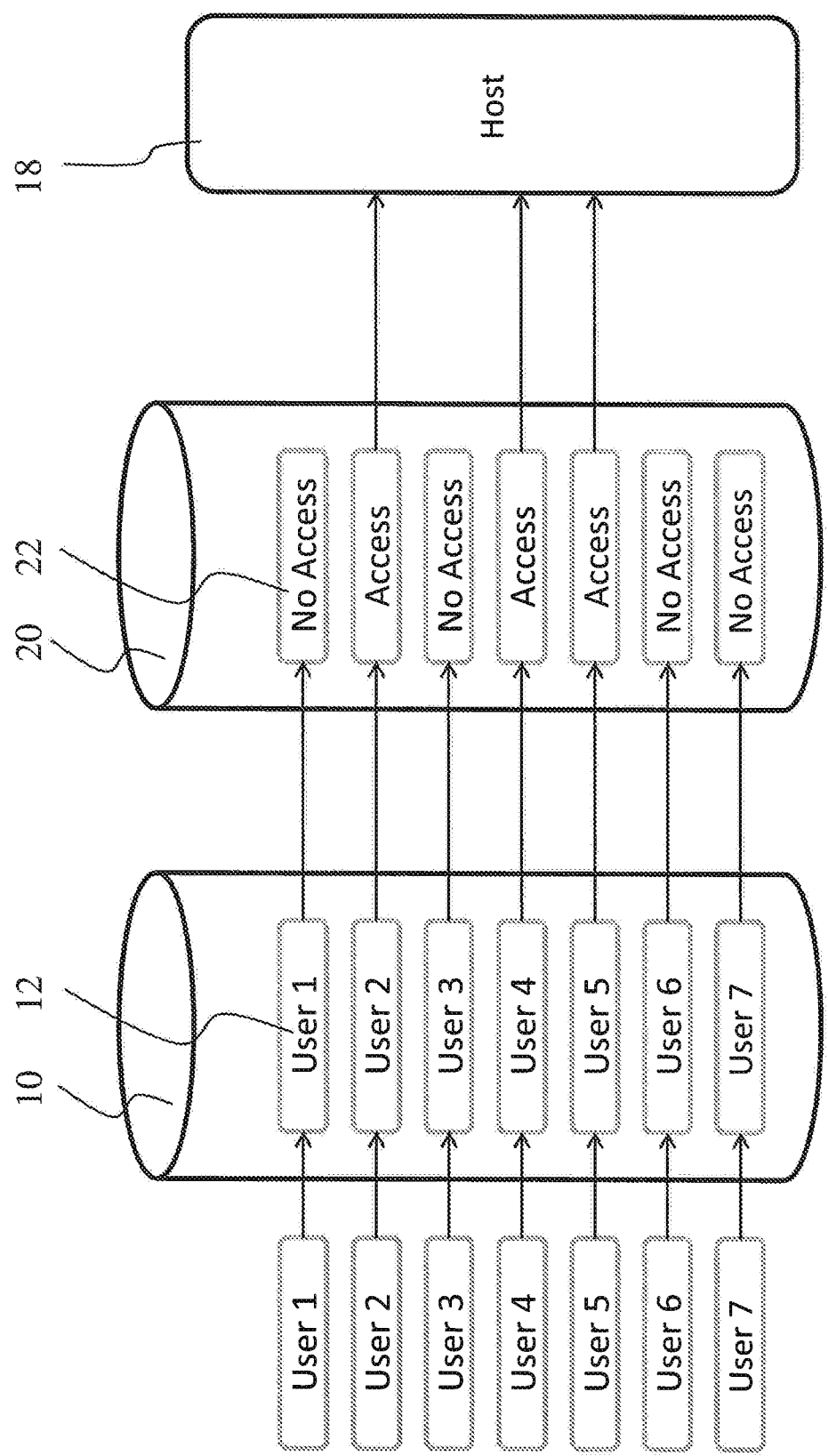

FIG. 6 shows an example where a filtering entity is located between a user information directory 10 storing user accounts for users 1 to 7 and a host 18. The intermediate entity 20 provides an access controlling filtering mechanism for hosts based on information of the user attributes. The filtering mechanism is based on user specific filtering information entries, or data entities 22, on individual basis. That is, the filtering mechanism can have a different attribute based filtering rule in a data entity for each directory user. Information about the different rules and/or attributes can be collected into one of more directory views.

The filtering mechanism may be provided e.g. in an authenticator manager (e.g. a key manager) or an intermediate apparatus, examples of which were discussed above.

Attribute based access control for directory users can be provided by a separate entity from a user information directory and the hosts. This has an advantage e.g. in that the basic user information can be processed and managed separately from managing and processing access control for the users in the directory and attribute based filtering at the local hosts. For example, in an organization employing people a human resources (HR) function can have a total control on the user information directory, enabling the HR to create and maintain the user information directory comprising details of an employee. The information technology (IT) department can then have a separate centralized control on access to various hosts through the filtering entity, without a need to access the HR controlled records and configuring the local hosts separately. Further, a set of filtering rules, called herein a directory view, can be used for a number of hosts, making the access management easier.

Figure 7:
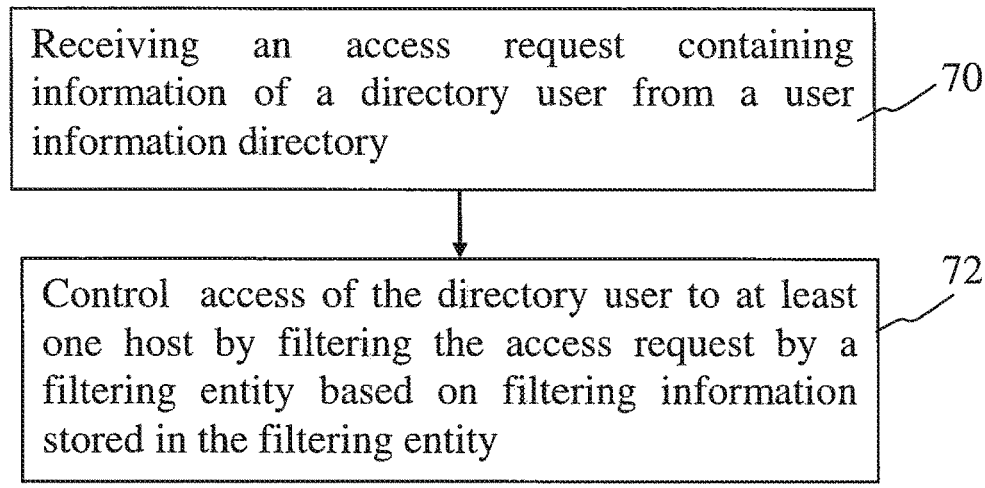
FIG. 7 shows a flowchart according to an example.

FIG. 7 shows a flowchart for a filtering operation. An access control mechanism for a computer network can receive at 70 an access request containing user identity information for a directory user obtained from a user information directory for storing user identity information, or another indication that can be used for mapping the request to appropriate filtering criteria. Access of the user to at least one host can then be controlled at 72 by filtering the access request by an access request filtering entity based on filtering information stored in a memory of the access request filtering entity for controlling access of the users to at least one host.

In accordance with an embodiment the filtering entity provides a host specific filter for selectively allowing on individual basis certain directory users in the directory to have access ("Access") to the host while blocking others ("No Access"). The filtering arrangement can be provided in the form of a data structure comprising user identities which are members to a directory user entity (e.g. all employees of a company) and filtering information for at least one host identifying those user identities of the members of the directory user entity who have access the at least one host.

At least one association of a user identification on a host with a directory user can be provided. For example, a separate database table listing which directory users are visible on each host can be provided. This can be e.g. of form [dir_user, user_name, host_id].

An identification of at least one storage location indicating that users whose home directory is within that storage location are permitted to access the host using credentials such as Secure Shell (SSH) keys or other keys they have associated with that storage location as their home directory.

A directory user data structure can comprise an identification of a user. User identity information can be arranged to indicate the directory user requesting for access as a user defined in a user information directory.

The identity can be e.g., a login name of a user, a full name of a user, a user ID, a unique ID, incitation whether the user is a directory user or a local user. In principle, this can be any information identifying the user as a user defined in a user information directory.

Identification or other information of at least one key, e.g. a SSH key, associated with the user may be provided. A key, e.g. a SSH key, can be an identity key authorizing a party able to use the key to access a host having a corresponding authorized key configured as an access granting key. A key, e.g. a SSH key, can be an authorized key granting access to at least one host that the user is permitted to access. The filtering apparatus can be configured to require an authorized key for granting a requested access to the at least one host in addition to user specific filtering information stored in the memory entity of the apparatus permitting the requested access.

A user may be identified as a directory user. Information identifying the user as a user defined in a user information directory may comprise identification of the user information directory where the user is defined.

Further information about at least one use of the identity key may also be provided and used in the filtering. Such information about the at least one use may comprise an indication of the time of use or times of use of the key. Information about the at least one use of the key identifies at least one host on which the key was used may also be provided. Information about the at least one use of the key identifies at least one host to which the key was used to authenticate is also possible. Yet further example is information about the at least one use of the key identifies at least one user the key was used to authenticate.

An identification of a storage location of home directory of the user may be included in the information. The storage location may refer to a network file system (e.g., NFS or CIFS; Common Internet File System).

Further information used may also comprise an identification of one or more storage locations used as the user's home directory on one or more hosts and an association of the at least one SSH key with a least one of the storage locations.

An identification of a natural person controlling the directory user may also be provided and used.

A further example is an indication of account type. For example, the account may be for an interactive user, a system administrator, a service account, a system account, a privileged account, a root account and so forth.

Information about authentications or logins as the indicated user on at least one host may also be used. Information about authentications or logins may comprise an indication of at least one time of the authentication or login or the time of last authentication login. Information about authentications or logins may also comprise at least one identification of the SSH key used for at least one authentication or login. Information about authentications or logins may comprise at least one identification of the host from which at least one authentication connection was made.

An association of at least one pair of user identification and host identification with the directory user may be provided.

Any of the aspects and elements described herein may be omitted, reordered, or combined to form new embodiments. No ordering on steps of processes or elements of embodiments is implied unless necessary in a particular context (even describing what is done first in a drawing is not intended to impose an ordering constraint in alternative embodiments). Some steps may be implemented as a continuous ongoing process. Any process step may be implemented as computer executable instructions, software modules, digital logic, or computer hardware, or any combination thereof, as applicable. Computer-executable instructions for causing a computer to perform any of the methods may be stored on a non-transitive computer-readable medium (such as RAM, ROM, DVD, file server, web server).

Figure 8:
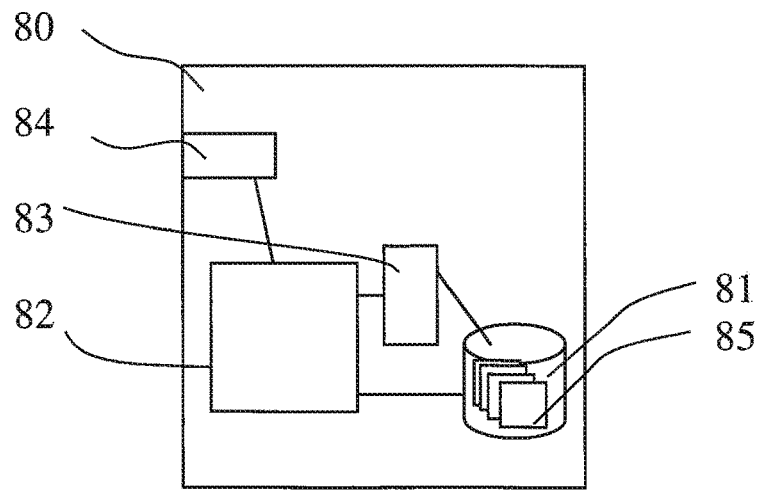
FIG. 8 shows a data processing apparatus suitable for implementing the examples.

FIG. 8 shows an example of control apparatus for a device capable of processing the above described functions. The control apparatus 80 can be for example integrated with, coupled to and/or otherwise controlling apparatus for managing the filter configuration information. For this purpose the control apparatus comprises at least one memory 81, at least one data processing unit 82, 83 and an input/output interface 84. The database 81 is shown to comprise entries, or data entities 85. Via the interface the control apparatus can be coupled to other elements of a network. The control apparatus can be configured to execute an appropriate software code to provide the control functions. The control apparatus can also be interconnected with other control entities.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various aspects, examples and features of various examples discussed above can be combined in manners not specifically shown by the drawings and/or described above.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

We claim:

1. An apparatus for a network node in a computer network comprising hosts accessible by directory users using a user information directory for accessing the hosts, wherein user identity information of the directory users is maintained in the user information directory as members of at least one directory user entity, wherein the user information directory maps user identity information of access requesting directory users to the at least one directory user entity, and wherein the directory users access the hosts as members of the at least one directory user entity, the apparatus comprising:
  at least one processor, and
  memory for storing instructions that, when executed, cause the network node to centrally, and separately from the user information directory, manage information for configuring attribute based filters for a plurality of hosts for attribute based filtering of access requests by the directory users to the plurality of hosts, wherein:
    an access requesting directory user is defined in an access request as a member of the at least one directory user entity based on a mapping, by the user information directory, of user identity information of the access requesting directory user to the at least one directory user entity,
    two or more hosts share an attribute based filter configuration provided by a separate entity from at least one of the two or more hosts, and
    the attribute based filter configuration shared by the two or more hosts provides a separate attribute based filtering of the access request based on a membership of the access requesting directory user to the at least one directory user entity,
  wherein the apparatus is configured to require a key for granting a requested access to at least one host in addition to user specific filtering information stored in a memory.

2. The apparatus according to claim 1, configured to manage the attribute based filters based on two matrices, wherein a first matrix is configured for mapping hosts to sets of filtering rules and a second matrix is configured for mapping the sets of filtering rules to at least one of a directory, an attribute, and a user.

3. The apparatus according to claim 1, configured to collect configuration information of the attribute based filters for filtering access requests by the directory users and maintain the collected configuration information separately from the user information directory.

4. The apparatus according to claim 1, further configured to control access of the directory users to one or more hosts by filtering access requests containing user identity information of a requesting directory user, wherein the filtering is based on directory user specific filtering information stored in a memory for controlling access of individual directory users to the one or more hosts.

5. The apparatus according to claim 4, wherein the user identity information of the requesting directory user is arranged to indicate a user defined in the user information directory.

6. The apparatus according to claim 4, wherein the user identity information of the requesting directory user is arranged to identify the user information directory where a user is defined.

7. The apparatus according to claim 1, wherein the key is an identity key arranged for authorizing a user to access a host having a corresponding authorized key configured as an access granting key.

8. The apparatus according to claim 1, further configured to use information about at least one use of the key, wherein the information about the at least one use of the key comprises information of at least one of:
  time of use or times of use of the key,
  identity of at least one host on which the key has been used,
  identity of at least one host to which the key has been used to authenticate a user, or
  identity of at least one user for whom the key has been used for authentication.

9. The apparatus according to claim 1, further configured to use information of authentications or logins as an indication of a directory user.

10. The apparatus according to claim 9, wherein the information of authentications or logins comprises at least one of:
  an indication of at least one time of authentication or login,
  an indication of a time of last authentication or login,
  at least one identification of a Secure Shell protocol key used for at least one authentication or login, or
  at least one identification of a host from which at least one authentication connection was made.

11. A method for managing access information in a computer network where hosts are accessible by directory users using a user information directory for accessing the hosts, wherein user identity information of the directory users is maintained in the user information directory as members of at least one directory user entity, wherein the user information directory maps user identity information of access requesting directory users to the at least one directory user entity, and wherein the directory users access the hosts as members of the at least one directory user entity, the method comprising:
  managing, centrally by a network node, for a plurality of hosts, in a storage, and separately from the user information directory, information regarding configuring of attribute based filters for attribute based filtering of access requests to the plurality of hosts by the directory users defined as members of the at least one directory user entity, wherein:
    the access requesting directory users are defined in the access requests as members of the at least one directory user entity based on a mapping, by the user information directory, of the user identity information of the access requesting directory users to the at least one directory user entity, two or more hosts share an attribute based filter configuration provided by a separate entity from at least one of the two or more hosts, and the attribute based filter configuration shared by the two or more hosts provides a separate attribute based filtering of the access requests based on memberships of the access requesting directory users to the at least one directory user entity, wherein an apparatus for the network node is configured to require a key for granting a requested access to at least one host in addition to user specific filtering information stored in a memory.

12. The method according to claim 11, comprising maintaining the information regarding the configuring of the attribute based filters in two matrices, wherein a first matrix maps hosts to sets of filtering rules and a second matrix maps the sets of filtering rules to at least one directory, attribute, and user.

13. The method according to claim 11, further comprising collecting configuration information of the attribute based filters for filtering access requests by the directory users and maintaining the collected configuration information separately from the user information directory and the plurality of hosts.

14. The method according to claim 13, wherein the collecting comprises scanning the plurality of hosts and/or monitoring traffic in the computer network.

15. The method according to claim 11, comprising filtering access requests based on the information regarding the configuring of the attribute based filters for attribute based filtering.

16. The method according to claim 15, further comprising:

receiving an access request containing user identity information for a directory user, and controlling access of the directory user to at least one host by filtering the access request by an access request filtering entity based on the user identity information for the directory user and the attribute based filters for attribute based filtering.

17. The method according to claim 15, further comprising identifying a user as a directory user.

18. One or more non-transitory computer-readable medium comprising a data structure, comprising:

a first data record associating hosts with configuration information records of configurations for attribute based filters for filtering access requests to the hosts in a computer network by directory users using a user information directory for accessing the hosts and defined as members of at least one directory user entity in the user information directory, wherein the user information directory maps user identity information of access requesting directory users to the at least one directory user entity and the directory users access the hosts as members of the at least one directory user entity, a second data record associating the configuration information records with sets of attributes, related users, and directories, and instructions that, when executed by a computing device, cause the computing device to manage centrally and separately from the user information directory information for configuring the attribute based filters for two or more hosts for attribute based filtering of the access requests by the directory users to the two or more hosts, wherein the directory users are defined in the access requests as members of the at least one directory user entity based on a mapping, by the user information directory, of user identity information of the directory users to the at least one directory user entity, wherein the two or more hosts share an attribute based filter configuration and the shared attribute based filter configuration is provided separately from at least one of the two or more hosts, and wherein the attribute based filter configuration shared by the two or more hosts provides a separate attribute based filtering of the access requests based on memberships of the directory users to the at least one directory user entity.

19. The one or more non-transitory computer-readable medium according to claim 18, wherein the instructions further cause the computing device to collect configuration information of the configurations for attribute based filtering of access requests by directory users from the computer network and to maintain the collected configuration information in the data structure separately from a user information directory and the two or more hosts.

20. A method for accessing hosts in a computer network where directory users access hosts using a user information directory maintaining user identity information for the directory users as members of at least one directory user entity, and the user information directory maps user identity information of access requesting directory users to the at least one directory user entity, the method comprising:

receiving a request for access to a host by an access requesting directory user defined in the request as a member of a directory user entity in the user information directory based on a mapping by the user information directory of user identity information of the access requesting directory user to the at least one directory user entity, wherein the access requesting directory user accesses the host as a member of the directory user entity, subjecting the received request for the access by the access requesting directory user to attribute based filtering by an attribute based filter configuration shared by two or more hosts and configured based on information for configuring attribute based filters for access requests by directory users, wherein the information for configuring attribute based filters is managed centrally by a network node for a plurality of hosts and separately from the user information directory and the two or more hosts share the attribute based filter configuration and the shared attribute based filter configuration is provided separately from at least one of the two or more hosts, and allowing or denying the access to the host for the access requesting directory user based on the attribute based filtering based on a membership of the access requesting directory user to the at least one directory user entity as defined in the request based on the mapping by the user information directory, wherein an apparatus for the network node is configured to require a key for granting a requested access to at least one host in addition to user specific filtering information stored in a memory.

* * * * *